United States Patent

[11] 3,590,379

[72] Inventors  Bernard F. Fellerman
                8, Avon Court, 25, Holden Road, Woodside Park, London, N.12;
                Henry S. Marro, 29, Highfield Avenue, Kingsbury, London, N.W. 9, both of, England
[21] Appl. No. 841,454
[22] Filed      July 14, 1969
[45] Patented   June 29, 1971
[32] Priority   July 19, 1968
[33]            Great Britain
[31]            34625/68

[54] MONOSTABLE MULTIVIBRATOR PULSE FREQUENCY METERS
     10 Claims, 2 Drawing Figs.
[52] U.S. Cl. ................................................. 324/169,
                                 307/273, 324/78, 324/173
[51] Int. Cl. .............................................. G01p 3/48
[50] Field of Search ...................................... 324/70, 78;
                                 307/273; 317/5

[56]                References Cited
                UNITED STATES PATENTS
3,303,353  2/1967  Sacha ........................... 307/273

FOREIGN PATENTS
919,421  2/1963  Great Britain ................  324/169

OTHER REFERENCES
C. D. Todd, "A Transistorized Tachometer," ELECTRONICS WORLD Nov. 1963, pp. 66 and 67 and 90.
R. E. Staerzl, " $6 Electronic Tachometer," POPULAR ELECTRONICS, Apr. 1967, pp. 61 and 62.

Primary Examiner—Michael J. Lynch
Attorneys—William D. Hall, Elliott I. Pollock, Fred C. Philpitt, George Vande Sande, Charles F. Steininger and Robert R. Priddy ABSTRACT: A vehicle instrument for providing an indication of engine or vehicle speed includes an indicating meter supplied from a monostable circuit. The monostable circuit is triggered by input pulses derived in dependence upon engine or vehicle speed. The monostable circuit includes two transistors forming the active components thereof, and the input pulses are applied to a side of a capacitor in the monostable circuit connected to the normally nonconducting one of said transistors. The monostable circuit is arranged to supply pulses of predetermined width and height product to the meter irrespective of the rate of occurrence of the input pulses.

B. F. FELLERMAN
H. S. MARRO
INVENTORS by Hall, Pollock & Vande Sande
ATTORNEYS

MONOSTABLE MULTIVIBRATOR PULSE FREQUENCY METERS

This invention relates to pulse frequency meters.

A pulse frequency meter may be employed as a speed indicator, e.g. as a tachometer for a vehicle engine and in this case pulses must be provided at a frequency proportional to engine speed. Pulses having a frequency proportional to engine speed may be produced by any convenient means, for example by a generator driven by the engine or, they may be taken from a point in the ignition system.

Earlier proposals of pulse frequency meters have included monostable circuits arranged to be triggered in dependence upon the occurrence of input signals for providing output signals to an electric meter.

One disadvantage of such proposals has been that, especially at high repetition rates of occurrence of the input signals, the monostable circuits have been triggered to switch from their stable state before completing each of their triggered cycles. In consequence, the output signals have had a smaller width at higher repetition rates than at lower repetition rates of occurrence of the input signals.

It is an object of the invention to provide a pulse frequency meter in which the output signals of the monostable are at least substantially unaffected by the repetition rate of the input signals.

According to the invention there is provided a pulse frequency circuit comprising a monostable circuit for supplying pulses to a current averaging device in response to input pulses having a frequency to be measured, and first and second terminals intended to be connected across a direct current supply, in which the monostable circuit includes a first transistor connected between the first terminal and a first collector resistor connected to the second terminal, a second transistor connected between the first terminal and one side of the current averaging device, means connecting the other side of the current averaging device to the second terminal, a connection between the collector of the first transistor and the base of the second transistor, a capacitor having one side connected to the base of the first transistor, a unidirectional conducting device connected between the other side of the said capacitor and the collector of the second transistor arranged to allow current to flow towards the collector of the second transistor, a first resistance means connected between the one side of the said capacitor and said second terminal, second resistance means connected between the other side of the capacitor and said second terminal, and means for applying the input pulses between the said other side of the capacitor and the first terminal.

As a pulse of predetermined width times height product is caused to pass through the meter on each occasion the monostable circuit is triggered the average current will be proportional to the frequency of the pulses and the meter will therefore indicate the pulse frequency.

In the above arrangement, the triggering pulses are applied between the first terminal and a point between the capacitor and the diode. This has the advantage that the width of the triggering pulses need not be controlled to be smaller than the charging or discharging time of the capacitor.

The pulse frequency device may include a voltage limiting means connected between said first and second terminals. In such a case, a third terminal may be provided to which the direct current supply is intended to be connected, and third resistance means connected between said third and second terminals through which said direct current supply is connected to said second terminal, and in which first resistance means is connected between said capacitor and said third terminal.

If a pulse frequency meter in accordance with this invention is used as a tachometer the current meter may be calibrated in units of rotational speed.

A tachometer embodying this invention will now be described, by way of example, with reference to the accompanying drawings of the circuit diagrams for the tachometer.

Figure 1:
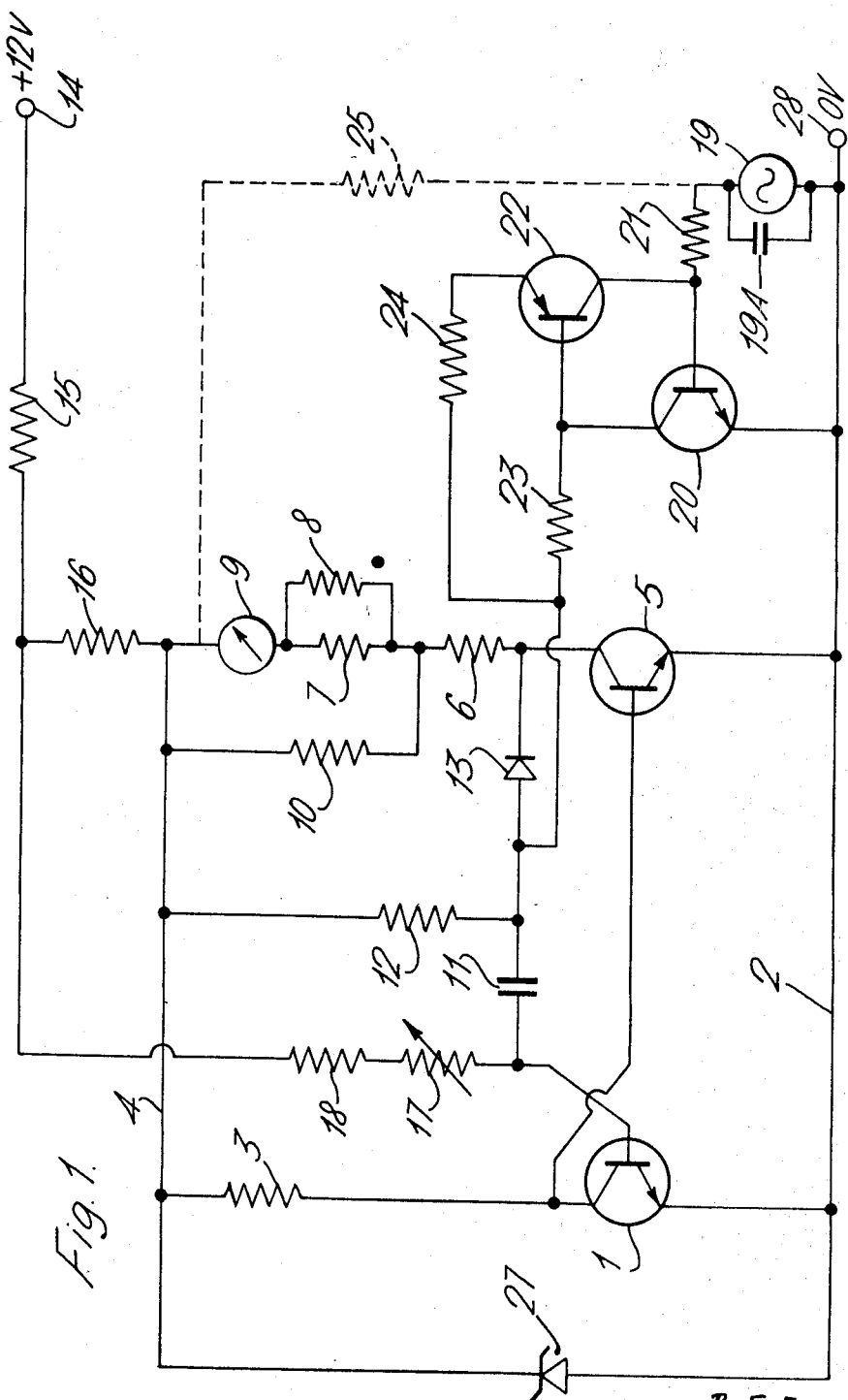
FIG. 1 is a schematic circuit diagram of an embodiment of this invention.

The tachometer is intended to be used to indicate the engine speed of a vehicle and includes a monostable circuit. This monostable circuit has an NPN transistor 1 the emitter of which is connected directly to a negative supply line 2; the collector of the transistor 1 is connected through a resistor 3 to a positive supply line 4 and also directly to the base of a further NPN transistor 5. The emitter of the transistor 5 is connected to the line 2 and the collector of the transistor 5 is connected through a series-combination, comprising a resistor 6, a resistor 7 in parallel with a thermistor 8 (a resistor having a large positive coefficient of change of resistance with temperature), and a milliameter 9, to the line 4. The milliameter 9 is a moving coil meter and is calibrated in units of engine speed. The junction of the resistor 6 with the parallel circuit of the resistor 7 and the thermistor 8 is connected to the line 4 through a resistor 10. The base of the transistor 1 is connected to the line 4 through a capacitor 11 and a resistor 12 in series. The junction of the capacitor 11 and of the resistor 12 is connected to the collector of the transistor 5 through a diode 13.

The line 4 is provided with positive potential from a positive supply terminal 14 through a stabilizing circuit. This stabilizing circuit comprises two resistors 15 and 16 connected in series between the terminal 14 and the line 4 and a Zener diode 27 connected between the lines 4 and 2. The line 2 is connected to a terminal 28 and this terminal and the terminal 14 are intended to be connected to the negative and positive terminals respectively of the vehicle battery; the potential between the terminals of a vehicle battery does, as is well known, vary in use, the function of the stabilizing circuit being to limit the corresponding variations of potential between the lines 4 and 2.

The base of the transistor 1 is also connected to the junction of the resistors 15 and 16 through a variable resistor 17 and a resistor 18 in series. This connection allows a small portion of the unstabilized supply voltage, developed across the resistor 16, to be injected through the resistors 18 and 17 for compensating for the internal resistance of the Zener diode 27.

A signal generator 19 in which FIG. 1 is intended to produce a train of input pulses for the circuit at the rate proportional to the engine speed is connected to the junction of the capacitor 11 and the diode 13 through a squaring circuit. The signal generator 19 may be a connection for example to the coil ignition system of the vehicle engine or may be the output winding of an A.C. generator driven by the vehicle engine. The squaring circuit includes an NPN transistor 20, the base of which is connected to one side of the output of the signal generator 19 through a resistance 21, the other side of the signal generator 19 being connected to the line 2. The emitter of the transistor 20 is connected to the line 2 whereas its collector is connected to the base of PNP transistor 22; the collector of the transistor 22 is connected directly to the base of the transistor 20. The collector of the transistor 20 and the emitter of the transistor 22 are connected to the junction of the capacitor 11 and of the diode 13 through a resistor 23 and a high value resistor (100K) 24 respectively. It will be seen that the transistors 20 and 22 are connected so that they act as a silicon controlled switch and may be replaced by such a switch.

The operation of the tachometer is as follows:

In the quiescent state of the monostable circuit, transistor 1 conducts whereas transistor 5 does not conduct so that no current passed through the meter 9. Consequently the capacitor 11 charges up with the electrode connected to the diode 13 at a positive potential with respect to the electrode connected to the base of the transistor 1. When a pulse appears in the output of the signal generator 19 the junction of the capacitor 11 and the diode 13 is effectively connected to the line 2 through the relatively high resistor 23 (3.3K) and the transistor 20 in series. The potential of the pole of the capacitor 11 connected to the base of the transistor 1 is therefore driven to a potential negative with respect to the line 2 and the emitter of the transistor 1 so that the current through the transistor 1 begins to fall. The resultant change in potential across the resistor 3 produces a potential at the base of the transistor 5 causing it to conduct and causing current to flow through the meter 9. As soon as the transistor 5 begins to conduct the electrode of the capacitor 11 connected to the diode 13 is effectively connected to the line 2 through a low resistance (the diode 13 and the transistor 5) so that the capacitor electrode connected to the base of the transistor 1 remains at a potential negative with respect to the line 2. The capacitor 11 discharges through the diode 13 and the transistor 5 and recharges from the junction of the resistors 15 and 16 through the resistor 18 and the potentiometric resistor 17. The transistor 1 remains cut off (and therefore the transistor 5 conducts fully) while the capacitor 11 is discharging through the diode 13 and the transistor 5 and is charging up through the resistor 18 and the potentiometric resistor 17 until the charge in the capacitor 11 is such that the potential of the electrode connected to the base of the transistor 1 is such as to cause it to begin to conduct. As soon as the transistor 1 begins to conduct the potential across the collector resistance 3 rises and the transistor 5 is then cut off. The capacitor 11 then discharges through the transistor 1 and recharges through the resistor 13 until it is fully charged with the electrode connected to the diode 13 at a positive potential with respect to the other electrode.

The effect of the action just described is that a current pulse is applied to the meter 9 on each occasion the generator 19 produces an input pulse. A capacitor 19A is connected across the generator 19 to remove spurious voltage spikes. Each of the current pulses have the same width times height product and the average current through the meter 9 is proportional to the engine speed as the frequency of the pulses produced by the generator 19 is proportional to the engine speed. The meter 9, which acts as an integrating device is calibrated as has been explained, directly in units of engine speed.

The width of each pulse applied to the meter 9 is dependent on the time constant of the circuit consisting of the capacitor 11, the resistor 17 and the resistor 18, varies in accordance with the potential between the terminals 14 and 28. The greater the potential between the terminals 14 and 28 the shorter is the time taken to charge up the capacitor 11 and the narrower the width of the pulse. The height of the pulse is dependent on the potential between the lines 4 and 2 and may vary slightly with variations in the potential between the terminals 14 and 28. However, the width and height product is a constant because any increase in the height of the pulses which occurs when the potential between the terminals 14 and 28 increases will be compensated for by the corresponding reduction in the width of the pulses.

The circuit just described has an advantage that, as the capacitor 11 is isolated by the diode 13 from the inductance of the meter 9, any ringing caused by the meter inductance is prevented from breaking through and producing nonlinearity at high pulse repetition frequencies. The monostable circuit illustrated is usable at pulse repetition frequencies up to 10—15 kc./s. whereas if the capacitor 11 is not isolated from the meter 9 the maximum practical pulse repetition frequency of the monostable circuit has been found to be of the order of 800 c/s.

The monostable circuit described has another advantage that once it is triggered it is unaffected by further triggering pulses until it has completed its output pulse to the meter 9. This is because as soon as the monostable circuit is triggered the signal generator 19 is short circuited by the transistor 5.

If an input pulse produced by the signal generator 19 is such that the pulse applied to the monostable circuit is longer than that produced by the monostable circuit for the meter 9, the action of the monostable proceeds to the state where the current pulse through transistor 5 has ended and transistor 1 is conducting; the diode 13 becomes reverse biased and the capacitor 11 cannot recharge through the resistor 12 until the applied pulse ends. As soon as the applied pulse ends, the capacitor 11 is recharged rapidly through resistor 12.

All the components of the tachometer illustrated in the drawing other than the signal generator 19, the meter 9, and the potentiometric resistor 17 can be readily incorporated in an integrated circuit.

A conventional monostable circuit can be made insensitive to triggering pulses longer than its output pulse by differentiating all input triggering pulses by means of a capacitor. However, one disadvantage of such an arrangement is that it is much more difficult to fabricate the described circuits as an integrated circuit.

The arrangement illustrated in the drawing can be used as a pulse generator and in which case the meter 9 and its associated components are omitted. In one application, the pulse generator can be arranged to be connected directly to a diode-transistor pump, for example, of a stylus-electrical position control system which controls the position of a stylus relative to a chart of a tachograph. In this application a tracing on the chart provides a record of the vehicle speed with respect to time, the chart being driven from a suitable form of timing device. The components 7, 8 and 10 provide temperature compensation in the usual way.

If the tachometer is required to operate from input pulses having a low magnitude the junction of the signal generator 19 and the resistor 21 is connected to the line 4 through a resistor 25 as indicated in dotted outline. The resistor 25 provides bias for the transistor 20 and enables the monostable circuit to be triggered from input pulses having a low magnitude.

It is to be noted that the signal generator 19 is connected to the junction of the capacitor 11 and the diode 13 through a relatively high resistance circuit so that the signal generator 19 is lightly loaded. This is of significance if the input signal is derived from the coil ignition system of an i.c. engine.

The circuit described and illustrated will operate as a speedometer if the signal generator 19 is the output winding of a tachogenerator driven at a rate proportional to the road speed of a vehicle, for example proportional to the speed of the vehicle propeller drive shaft or road wheels, and if the meter 9 is appropriately calibrated. In this case, the amplitude of the output of the generator 19 must, at all vehicle speeds of interest, exceed the switching potential of the transistors 20 and 22 once, and only once, per cycle.

Figure 2:
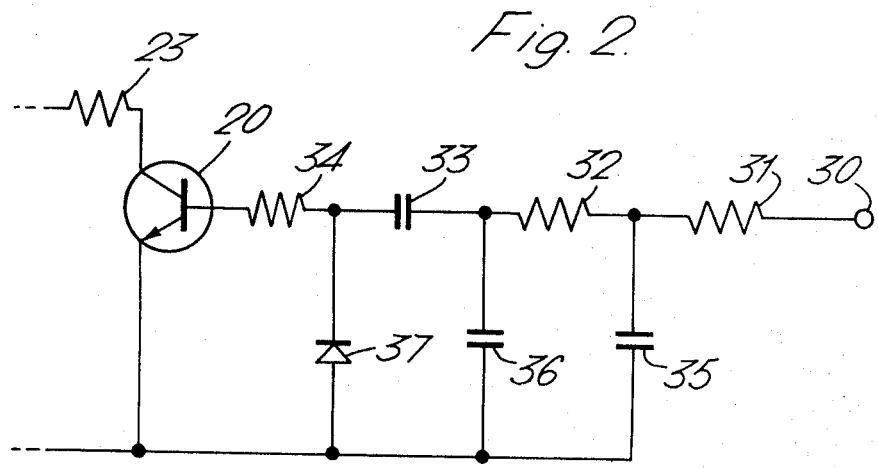
FIG. 2 is an alternative circuit for use when the input signals are derived from the contact breaker of a vehicle ignition distributor.

The tachometer so far described is provided with input signals from the signal generator 19. In an alternative arrangement, the input signals are derived from the contact breaker of the vehicle ignition distributor. The alternative part of the circuit is shown in FIG. 2. A terminal 30 is connected to the contact breaker for supplying input signals through a series connection, consisting of a resistor 31, a resistor 32, a capacitor 33 and a resistor 34, to the base of the transistor 20. Capacitors 35 and 36 are connected respectively between the line 2 and the junction between the resistor 31 and 32 and the junction between the resistor 32 and the capacitor 33. A diode 37 is connected between the line 2 and the junction between the capacitor 33 and the resistor 34.

The input signals derived at the contact breaker have high frequency transients. Filtering circuit components 31 and 35, and 32 and 36 are provided to remove such transients. The capacitor 33 acts to AC-couple the filtering circuits and the transistor 20. The capacitor 33 together with the resistor 34 also provides additional filtering.

In this alternative arrangement, a capacitor (not shown) is preferably provided and connected between the base and collector of the transistor 5 to prevent false triggering of the monostable due to radiated electrical noise.

We claim:

1. A pulse frequency circuit comprising a monostable circuit for supplying pulses to a current averaging device in response to input pulses having a frequency to be measured, and first and second terminals intended to be connected across a direct current supply, the monostable circuit including a first transistor connected between the first terminal and a first collector resistor connected to the second terminal, a second transistor connected between the first terminal and one side of the current averaging device, means connecting the other side of the current averaging device to the second terminal, a connection between the collector of the first transistor and the base of the second transistor, a capacitor having one side connected to the base of the first transistor, a unidirectional conducting device connected between the other side of the said capacitor and the collector of the second transistor arranged to allow current to flow towards the collector of the second transistor, a first resistance means connected between the one side of the said capacitor and said second terminal, second resistance means connected between the other side of the capacitor and said second terminal, and means for applying the input pulses between the said other side of the capacitor and the first terminal.

2. A pulse frequency meter according to claim 1, in which said unidirectional conducting device is a diode.

3. A pulse frequency device according to claim 1, including a voltage limiting means connector between said first and second terminals.

4. A pulse frequency meter according to claim 3, including a third terminal to which the direct current supply is intended to be connected, third resistance means connected between said third and second terminals through which said direct current supply is connected to said second terminal, and said first resistance means being connected between said one side of said capacitor and said third terminal.

5. A pulse frequency circuit according to claim 1, including input circuit means to which said input signals are supplied, said input circuit means including a squaring circuit arranged to supply square wave pulses to said monostable circuit in response to said input signals.

6. A pulse frequency circuit according to claim 5, in which the input circuit means includes resistance means arranged to increase the input-impedance of the input circuit to a high value.

7. A shaft revolution counter including the pulse frequency circuit according to claim 1, and an input signal generator arranged to respond to revolutions of a shaft to generate said input pulses at a frequency in dependence upon the revolutions of the shaft.

8. A vehicle engine tachometer for a vehicle having an ignition system including the pulse frequency circuit according to claim 1, and an input signal generator arranged to be initiated by said ignition system to produce said input pulses.

9. A vehicle engine tachometer for a vehicle having an ignition system including a pulse-frequency circuit according to claim 1, and an input circuit arranged to be connected to a contact breaker in a distributor of the ignition system and to provide said input pulses.

10. A vehicle engine tachograph including a pulse frequency circuit according to claim 1 and an electrical position control system for a speed-indicating stylus of the tachograph in which the control system is arranged to be controlled by an output of the said averaging device.